Figure 5:
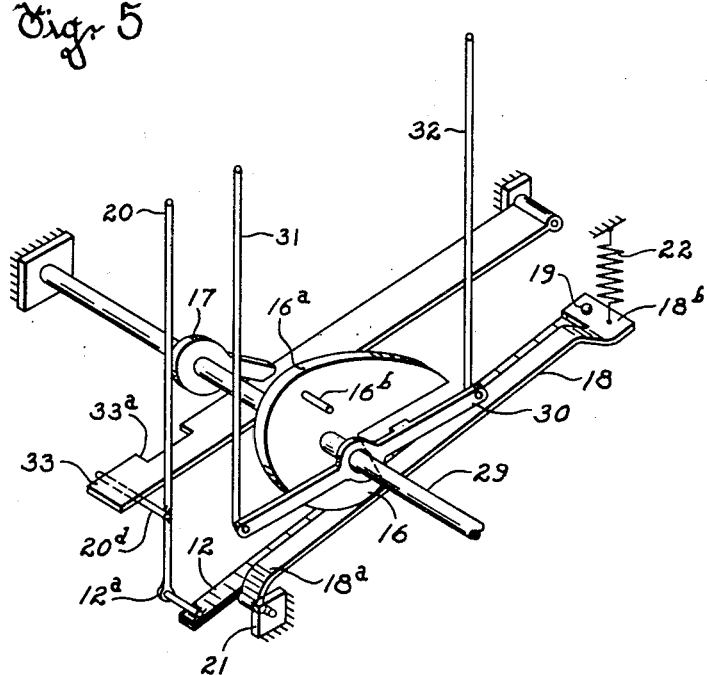

Feb. 21, 1950  C. W. KUHN  2,498,127
THERMALLY RESPONSIVE SWITCHING DEVICE
Filed Dec. 1, 1947  3 Sheets-Sheet 1

Inventor
Clarence W. Kuhn
By Frank H. Hubbard
Attorney

Feb. 21, 1950 C. W. KUHN 2,498,127
THERMALLY RESPONSIVE SWITCHING DEVICE
Filed Dec. 1, 1947 3 Sheets-Sheet 2
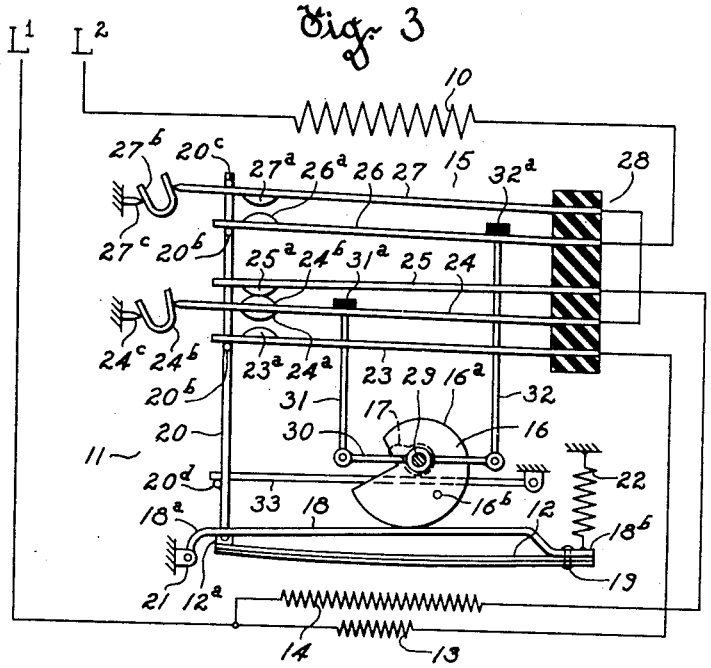
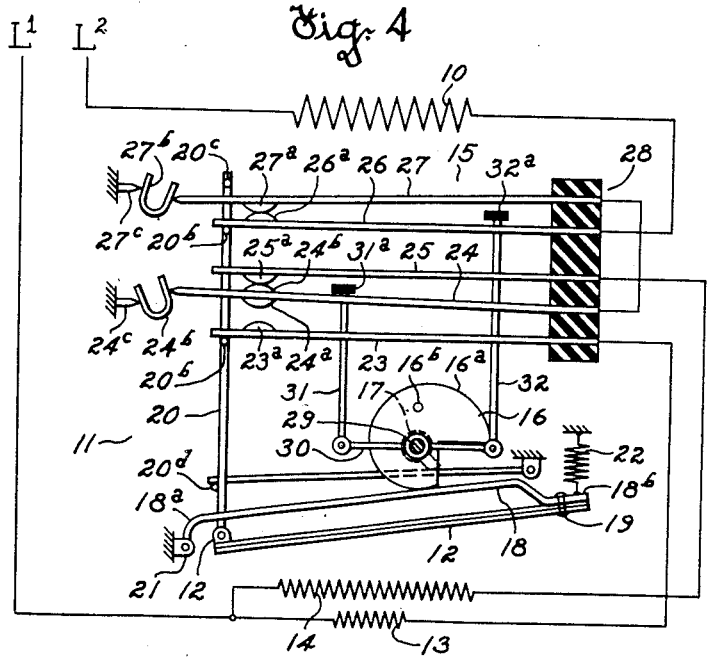
Inventor
Clarence W. Kuhn
By Frank H. Hubbard
Attorney Feb. 21, 1950     C. W. KUHN     2,498,127
THERMALLY RESPONSIVE SWITCHING DEVICE
Filed Dec. 1, 1947     3 Sheets-Sheet 3

Inventor
Clarence W. Kuhn
By Frank W. Hubbard
Attorney

Patented Feb. 21, 1950

2,498,127

UNITED STATES PATENT OFFICE 2,498,127

THERMALLY RESPONSIVE SWITCHING DEVICE

Clarence W. Kuhn, Wauwatosa, Wis., assignor to Cutler-Hammer, Inc., Milwaukee, Wis., a corporation of Delaware Application December 1, 1947, Serial No. 788,985

12 Claims. (Cl. 175—373)

This invention relates to a controller for electric circuits and is particularly advantageous for control of surface units of electric ranges.

It has been found desirable in connection with surface units of electric ranges to provide automatic controllers therefor which may be adjusted at will to provide for maintenance of a desired heat out-put of such units at any number of values between off and fully on. Another desired feature of such controllers is that the surface units be initially energized at a maximum rate until a desired value of heat out-put therefrom is approximated. The present invention has among its objects to provide for such surface units and other electric circuits of similar character a controller affording control of the aforementioned type.

Another object is to provide a controller of the aforementioned character wherein the desired control is obtained through the medium of a single thermally responsive element.

Another object is to provide a controller of the aforementioned character that operates to afford control of such surface units or electric circuits of similar character substantially independently of the thermal condition of such units or circuits.

Another object is to provide a controller of the aforementioned character which is compact, relatively simple, and easy to manufacture.

Other objects and advantages of the invention will hereinafter appear.

In the drawing:

Figures 1 to 4 inclusive are more or less schematic showings of a controller together with an electric heater which is controlled thereby; the controller being shown in various operating conditions, and Fig. 5 is a view in perspective showing certain details of the controller.

Referring to the drawings, Figs. 1 to 4 inclusive show an electric heater 10 and a control device 11 connected in a circuit between power supply lines L¹ and L². Electric heater 10 is shown schematically and may be assumed to represent any electric heater such as, for example, a surface unit or hot plate of an electric range.

Control device 11 generally comprises a bimetallic element 12 which responds to heat generated by the auxiliary heater 13 or alternatively by the heat generated by the auxiliary heater 14 to effect operation of a multiple contact switch 15. Control device 11 is additionally provided with manually adjustable rotatable cams 16 and 17 which according to their adjustments provide selectively an "off" position, a "full-on" position, and intermediate operating positions between "off" and "fully-on" for said device. Preferably control device 11 is located remotely from the heater 10 so that it will be substantially uninfluenced by the heat generated by the latter.

The bimetallic element 12 is preferably of strip form and is fixed at one end to a supporting frame 18 as by a rivet 19. The free end of element 12 is preferably pivotally connected to a switch contact operating rod 20 as by a pivot 12ᵃ. Rod 20 is adapted to be moved linearly in opposite directions by element 12 as it warps in response to increase or decrease in temperature.

The frame 18 is pivotally mounted on a fixed pivot 21. The portion 18ᵃ of frame 18 is substantially parallel with a greater portion of length of the element 12, but is offset therefrom. The end portion 18ᵇ of frame 18 has an extension to which the element 12 is connected by the rivet 19. A tension spring 22 is attached to the portion 18ᵇ of frame 18 and insures that the portion 18ᵃ of the latter will engage with the cam surface 16ᵃ of cam 16 for all positions of the latter.

Preferably, the pivot 12ᵃ connecting rod 20 and the bimetallic element 12 assumes a substantially coaxial relation with respect to the pivot 21 of frame 18 when element 12 is influenced by ambient temperatures only; such a relation preventing any appreciable movement of rod 20 when frame 18 is pivotally moved to adjust element 12 with respect to heaters 13 and 14.

The multiple contact switch 15 comprises a plurality of contact carrying levers 23, 24, 25, 26 and 27 which are fixed at corresponding ends within a block 28 formed of a suitable insulating material. Preferably these contact carrying levers are made from strips of resilient metal and are provided with individual wiring terminals which extend outwardly on one side of the block 28. Each of the levers is electrically insulated from the others by the block 28.

Lever 23 is provided adjacent its free end with a contact 23ᵃ which is adapted to engage with a contact 24ᵃ mounted correspondingly on the adjacent side of lever 24.

Lever 24 is also provided with a contact 24ᵇ mounted on its opposite side which is adapted to engage with a contact 25ᵃ mounted correspondingly on the adjacent side of lever 25. The extended free end portion of lever 24 engages with a U-shaped, "over center" spring 24ᶜ. Spring 24c also bears against a fixed pivot 24d. Spring 24e provides for rapid movement of the lever 24 in opposite directions whenever the latter is moved over dead center with respect to pivot 24d in a well-known manner.

Lever 26 is provided with a contact 26a which is adapted to engage with a contact 27a mounted correspondingly on the adjacent side of lever 27.

Lever 27 is provided with a U-shaped, "over center" spring 27b which is mounted between a fixed pivot 27c and the extended free end portion of lever 27.

The rod 20 is provided with fixed lugs or projections 20a, 20b and 20c which extend at right angles with respect to its longitudinal axis; said lugs being of insulating material or insulated from one another. The lug 20a underlies the lever 23 adjacent its free end and is adapted to move the latter when the element 12 warps toward switch 15. Similarly the lug 20b underlies the lever 26 adjacent its free end and is adapted to move lever 26 when element 12 warps as aforedescribed. The lug 20c overlies lever 27 adjacent its free end and provides a limit stop for movement of the latter in one direction and also provides for movement of lever 27 in the opposite direction when the element 12 warps in the opposite direction from that aforedescribed. The conditions under which the levers 23, 26 and 27 are respectively moved by the lug 20a, 20b and 20c will be hereinafter described.

The cam 16 is attached to a manual coaxial control member 29 by which it is adapted to be rotated in reverse directions thereby to pivotally move the assembly comprising the element 12 and the frame 18 toward or away from auxiliary heaters 13 and 14. The cam surface 16a is formed to provide even increments of movement of said assembly between the high and low points of the cam surface 16a, or for movement of the assembly in any other relation as desired.

A lever 30 is centrally supported coaxially with control member 29 and cam 16 but is not locked to member 29. Lever 30 is pivotally attached at its opposite ends to parallel rods 31 and 32. A lug 16b fixed on cam 16 is adapted to engage with lever 30 when control member 29 is moved toward the "off" position thereby to move lever 30 in the counterclockwise direction. Such counterclockwise movement of lever 30 to the "off" position causes the rod 31 to move downwardly and the rod 32 to move upwardly. Downward movement of rod 31 causes engagement of its end stop 31a, made of a suitable insulating material, with the lever 24 thereby to move the latter downwardly so that its contact 24a is held into positive engagement with contact 23a of lever 23. The simultaneous upward movement of rod 32 causes engagement of its end stop 32a, also made of a suitable insulating material, with the lever 27 thereby to move the latter upwardly to a point just below the dead center position of the spring 27b in which position it disengages the contact 27a from the contact 26a. So long as member 29 is maintained in the "off" position aforedescribed the contacts 26a and 27a will be held open to deenergize the electric heater 10.

Cam 17 is fixedly attached to control member 29 in a given angular relation with respect to the cam 16. Preferably, it is positioned on the opposite side of cam 16 from which the lug 16b projects. When member 29 is adjusted so that the low part of cam surface 16a engages with the portion 18a of frame 18, as shown in Figs. 4 and 5, cam 17 is adapted to engage pivoted lever 33 thus moving lug 20d fixed to the rod 20 if the latter is not already in such a position; lever 33 thereby locking rod 20 so that the contacts 26a and 27a will be held in continuous engagement. As will be understood, when the lever 33 is moved by cam 17 to such an operating position, the rod 20 is restrained against movement in the upward direction. Preferably, lever 33 is provided with a notch 33a, as shown in Fig. 5, to provide clearance for the cam 17 when the high point of cam 16 engages the portion 18a of frame 18.

The auxiliary heaters 13 and 14 have a common connection to power supply line L$^1$. The other end of heater 13 is connected to the terminal of contact lever 23 while the other end of the heater 14 is connected to the terminal of contact lever 25. The terminals of levers 24 and 27 are interconnected and the terminal of lever 26 is connected to one terminal of the heater 10. The opposite terminal of heater 10 is connected to power supply line L$^2$.

Auxiliary heater 13 is preferably a "slow" heater having a relatively high thermal time constant while the auxiliary heater 14 is preferably a "fast" heater having a relatively low thermal time constant. Heater 13 is preferably formed from a few turns of heavy-resistance wire wound on a hollow cylindrical core formed of a suitable ceramic material and may be provided with a coating of a solidified vitreous enamel to further retard heat transmission. Heater 14 on the other hand is preferably formed of a large number of turns of bare, light-resistance wire. Preferably heater 14 is of greater length than heater 13 and overlies a greater portion of the bimetallic element 12. The ratio of the thermal time constants of the auxiliary heaters 13 and 14 is preferably of the order of 6 to 1.

The operation of the control device 11 will now be described. The various elements of the device are shown in the "off" position in Fig. 1. It will be assumed that the control member 29 is turned clockwise so that the cam 16 is positioned as shown in Figs. 2 and 3 to provide for a desired level of heat input to the electric heater 10. When the cam 16 is rotated to such a position the lug 16b disengages the lever 30 and the latter is free to move in the clockwise direction thus allowing the rods 31 and 32 to move respectively upwardly and downwardly under the pressure of the contact levers 24 and 27 against the end stops 31a and 32a. As the spring 24c is below its dead center position contacts 23a and 24a remain in engagement (as shown in Fig. 1). The spring 27b is moved to its extreme below dead center position thereby providing for engagement of contacts 26a and 27a (as shown in Fig. 2). A closed circuit is thereby established from line L$^1$, through auxiliary heater 13, through contacts 23a and 24a, through contacts 26a and 27a, and through electric heater 10 to line L$^2$.

The bimetallic element 12 is then heated at a slow rate by the auxiliary heater 13, and, as it heats, it bows or warps toward the switch 15. In so doing element 12 causes the rod 20 to move upwardly and thus lug 20a engages lever 23 causing the levers 23 and 24 to move upwardly therewith. When the lever 24 reaches a position just above dead center with respect to pivot 24c, the spring 24b causes the lever 24 to move rapidly in the upward direction thereby disengaging contact 24a from contact 23a and causing engagement of the contact 24b with contact 25a with snap action. The circuit through the electric heater 10 is momentarily interrupted and a new circuit is established from line L¹ through auxiliary heater 14, contacts 25ᵃ and 24ᵇ, contacts 27ᵃ and 26ᵃ, and through electric heater 10 to supply line L². The operating position of the device thus attained is depicted in Fig. 2.

Thereafter the bimetallic element 12 is heated at an increased rate by the auxiliary heater 14 and continues to warp in the direction aforementioned, but at an increased rate. This warping causes lug 20ᵇ of rod 20 to move levers 26 and 27 upwardly. When lever 27 reaches a position just above dead center with respect to pivot 27ᶜ, the spring 27ᵇ causes lever 27 to move rapidly in the upward direction thereby disengaging the contact 27ᵃ from the contact 26ᵃ with snap action. The operating position thus attained is depicted in Fig. 3; the electric heater 10 and the auxiliary heater 14 being disconnected from circuit.

Subsequently, the bimetallic element 12 cools and warps in the opposite direction toward auxiliary heaters 13 and 14. The lug 20ᶜ of rod 20 moves the lever 27 downwardly. When lever 27 reaches a position just below the dead center with respect to pivot 27ᶜ, the spring 27ᵇ moves lever 27 rapidly in the downward direction to effect snap action engagement of contact 27ᵃ with contact 26ᵃ. The circuit from line L¹ through heater 14 and electric heater 10 to line L² is re-established and the cycle of operation aforedescribed between the positions depicted in Figs. 2 and 3 is repeated. The cycling operation of the device 11 continues so long as the position of control member 29 remains as originally set.

If control member 29 is turned to the extreme position in the clockwise direction, the portion 18ᵃ of frame 18 will be engaged by the low point of cam surface 16ᵃ of cam 16 and simultaneously the cam 17 will lock rod 20 by means of lever 33 and lug 20ᵈ as aforedescribed. In such operating position of device 11, the electric heater 10 will be continuously energized, as the contacts 26ᵃ and 27ᵃ will be held in engagement regardless of any warping of the bimetal element 12 due to possible heating of the same by the auxiliary heater 14. Also in this operating position, the bimetallic element 12 is moved sufficiently far from the auxiliary heater 14 so that the latter is substantially ineffective to cause warping of the bimetal element 12. This operating position, as depicted by Fig. 4, provides a "full-on" position for the device.

The operating condition of the control device 11 depicted in Fig. 4 will obtain if the control member is turned to the "full-on" position from an intermediate position such as that depicted in Figs. 2 and 3. However, if control member 29 is turned initially from the "off" position depicted in Fig. 1 directly to the "full-on" position, the operating condition of control device 11 will be essentially the same as that depicted in Fig. 4 with the exception that the condition of lever 23, contact 23ᵃ, lever 24, contacts 24ᵃ and 24ᵇ, and spring 24ᶜ will be that depicted in Fig. 1. Regardless of the latter difference the "full-on" position will likewise be obtained.

Adjusting control member 29 to intermediate positions, other than that depicted in Figs. 2 and 3, between the "off" and "full-on" positions aforedescribed, changes the ratio of the time the contacts 26ᵃ and 27ᵃ are closed to the time they are open. If control member 29 is set at another intermeidate position, farther in the clockwise direction, the closed time of contacts 26ᵃ and 27ᵃ will be increased. Conversely, by setting control member 29 at another intermediate position in the counterclockwise direction, the closed time of contacts 26ᵃ and 27ᵃ will be decreased. In all such intermediate positions, the open time of contacts 26ᵃ and 27ᵃ will be substantially the same due to the fact that the bimetallic element 12 cools at a substantially constant rate.

Adjustment of control member 29 to various intermediate positions aforedescribed correspondingly changes the period of time when the contacts 24ᵃ and 25ᵃ are initially engaged to effect energization of auxiliary heater 13.

Although the cam 17, lever 33, and the lug 20ᵈ have been provided to afford holding the contacts 26ᵃ and 27ᵃ in engagement in the "full-on" position of device 11, these elements may be omitted if desired. Depending on prevailing conditions, the movement of the bimetallic element 12 to an extreme position from the auxiliary heaters 13 and 14 may be sufficient to prevent appreciable heating of the element such as would cause interruption of the circuit through the electric heater 10.

What I claim as new and desire to secure by Letters Patent is:

1. The combination with circuit closing and opening means including a thermally responsive element to cause said means to close and open a circuit as a function of reverse operations of said thermally responsive element, of a heater in heat exchange relationship to said element for heating the same at a given rate, a heater in heat exchange relationship to said element for heating the same at a faster rate, and selecting means for said heaters controlled by said thermally responsive element initially rendering effective the first mentioned heater only and then upon attainment of a given thermal condition of said element rendering said first mentioned heater ineffective and rendering the second mentioned heater effective.

2. The combination with circuit closing and opening means including a thermally responsive element to cause said means to close and open a circuit as a function of reverse operations of said thermally responsive element, of a heater in heat exchange relationship to said element for heating the same at a given rate, a heater in heat exchange relationship to said element for heating the same at a faster rate, and selecting means for said heaters controlled by said thermally responsive element initially rendering effective the first mentioned heater only and then upon attainment of a given thermal condition of said element rendering said first mentioned heater ineffective and rendering the second mentioned heater effective, the first mentioned means including means rendering said second mentioned heater ineffective upon circuit interrupting operation of said first mentioned means.

3. The combination with circuit closing and opening means including a thermally responsive element to cause said means to close and open a circuit as a function of reverse operations of said thermally responsive element, of a heater in heat exchange relationship to said element for heating the same at a given rate, a heater in heat exchange relationship to said element for heating the same at a faster rate, and selecting means for said heaters controlled by said thermally responsive element initially rendering effective the first mentioned heater only and then upon attainment of a given thermal condition of said element rendering said first mentioned heater ineffective and rendering the second mentioned heater effective, the first mentioned means including means rendering said second mentioned heater responsive to subsequent circuit opening and closing operations of said first mentioned means for heating of said thermally responsive element in cycles while said first mentioned heater remains ineffective.

4. The combination with circuit closing and opening means including a thermally responsive element to cause said means to close and open a circuit as a function of reverse operations of said thermally responsive element, of a heater in heat exchange relationship to said element for heating the same at a given rate, a heater in heat exchange relationship to said element for heating the same at a faster rate, selecting means for said heaters controlled by said thermally responsive element initially rendering effective the first mentioned heater only and then upon attainment of a given thermal condition of said element rendering said first mentioned heater ineffective and rendering the second mentioned heater effective, the first mentioned means including means rendering said second mentioned heater responsive to subsequent circuit opening and closing operations of said first mentioned means for heating of said thermally responsive element in cycles while said first mentioned heater remains ineffective, and means affording adjustment at will of the duration of such cycles.

5. The combination with circuit closing and opening means including a thermally responsive element to cause said means to close and open a circuit as a function of reverse operations of said thermally responsive element, of a heater in heat exchange relationship to said element for heating the same at a given rate, a heater in heat exchange relationship to said element for heating the same at a faster rate, selecting means for said heaters controlled by said thermally responsive element initially rendering effective the first mentioned heater only and then upon attainment of a given thermal condition of said element rendering said first mentioned heater ineffective and rendering the second mentioned heater effective, the first mentioned means including means rendering said second mentioned heater responsive to subsequent circuit opening and closing operations of said first mentioned means for heating of said thermally responsive element in cycles while said first mentioned heater remains ineffective, and means associated with said first mentioned means affording at will adjustment of the duration of such cycles and also affording at will termination of said cycles to maintain said first mentioned means in either a closed or an open circuit condition.

6. The combination with a set of switch contacts to complete or interrupt a circuit, of a thermally responsive element affording opening and closing of said contacts as a function of reverse operations of said element, an electric heater in heat exchange relationship to said element for heating the same at a given rate, an electric heater in heat exchange relationship to said element for heating the same at a faster rate, and other cooperating contacts for establishing circuit connections for said heaters selectively, certain of said other contacts being movable and under the control of said thermally responsive element to render the selection of said heaters automatic according to the thermal condition of said element.

7. The combination with a set of switch contacts to complete or interrupt a circuit, of a thermally responsive element, an electric heater in heat exchange relationship to said element for heating the same at a given rate, an electric heater in heat exchange relationship to said element for heating the same at a faster rate, switch contacts to commutate the connections of said heaters, and operating connections between said thermal element and certain of the first mentioned and the last mentioned contacts affording initially setting of said contacts to complete said circuit and to energize the first mentioned heater alone and then upon attainment of a given thermal condition of said element effecting operation of certain of said contacts to deenergize the first mentioned heater and to energize the second mentioned heater, said element then acting under the influence of the second mentioned heater to thereafter effect circuit interrupting operation of said first mentioned contacts and as an incident thereto deenergization of said second mentioned heater, and said element as a function of subsequent cooling thereof effecting circuit completing operation of said first mentioned contacts and as an incident thereto reenergization of said second mentioned heater.

8. The combination with a set of switch contacts to complete or interrupt a circuit, of a thermally responsive element, an electric heater in heat exchange relationship to said element for heating the same at a given rate, an electric heater in heat exchange relationship to said element for heating the same at a faster rate, switch contacts to commutate the connections of said heaters, operating connections between said thermal element and certain of the first mentioned and the last mentioned contacts affording initially setting of said contacts to complete said circuit and to energize the first mentioned heater alone and then upon attainment of a given thermal condition of said element effecting operation of certain of said contacts to deenergize the first mentioned heater and to energize the second mentioned heater, said element then acting under the influence of the second mentioned heater to thereafter effect circuit interrupting operation of said first mentioned contacts and as an incident thereto deenergization of said second mentioned heater, and said element as a function of subsequent cooling thereof effecting circuit completing operation of said first mentioned contacts and as an incident thereto reenergization of said second mentioned heater, and means affording adjustment at will of the ratio of time the circuit is completed to the time said circuit is interrupted.

9. The combination with first and second movable contact members affording completion of a circuit when engaged or alternatively affording interruption of said circuit when disengaged, of a bimetallic element, an electric heater in heat exchange relationship to said element for heating the same at a given rate, an electric heater in heat exchange relationship to said element for heating the same at a faster rate, a third movable contact member, a fourth movable contact member, a relatively stationary contact member, said third and fourth members being adapted to engage or disengage to complete or interrupt a series connection of said first mentioned heater with said first member, said third and stationary members being adapted to engage or disengage to complete or interrupt a series connection of said second mentioned heater with said first member, operating connections between said element, said first member, said third member and said fourth member affording initial positioning of the members such that said first and second members are engaged and said third and fourth members are engaged to complete said circuit thereby to energize said first mentioned heater alone and then upon attainment of a given thermal condition of said element effecting movement of said third and fourth members for disengagement and for engagement of said third member and said stationary member thereby to de-energize said first mentioned heater and to energize said second mentioned heater, said element then acting under the influence of the second mentioned heater and through the medium of said operating connections effecting disengagement of said first and second members thereby to interrupt said circuit and de-energize said second mentioned heater subject to re-establishment of said circuit and re-energization of said second mentioned heater by reengagement of said first and second members as a function of the cooling of said element, spring means associated with said first member affording it movement with a snap action to effect engagement or disengagement of said member with said second member according to the direction of movement when said first member is moved beyond a given intermediate position, and spring means associated with said third member affording it movement with a snap action to effect disengagement of said member from said fourth member and engagement of said third member with said stationary member or vice versa according to the direction of movement when said third member is moved beyond a given intermediate position.

10. The combination with first and second movable contact members affording completion of a circuit when engaged or alternatively affording interruption of said circuit when disengaged, of a bimetallic element, an electric heater in heat exchange relationship to said element for heating the same at a given rate, an electric heater in heat exchange relationship to said element for heating the same at a faster rate, a third movable contact member, a fourth movable contact member, a relatively stationary contact member, said third and fourth members being adapted to engage or disengage to complete or interrupt a series connection of said first mentioned heater with said first member, said third and stationary members being adapted to engage or disengage to complete or interrupt a series connection of said second mentioned heater with said first member, operating connections between said element, said first member, said third member and said fourth member affording initial positioning of the members such that said first and second members are engaged and said third and fourth members are engaged to complete said circuit and thereby to energize said first mentioned heater alone and then upon attainment of a given thermal condition of said element effecting movement of said third and fourth members for disengagement and for engagement of said third member and said stationary member thereby to de-energize said first mentioned heater and to energize said second mentioned heater, said element then acting under the influence of the second mentioned heater and through the medium of said operating connections effecting disengagement of said first and second members thereby to interrupt said circuit and de-energize said second mentioned heater subject to reestablishment of said circuit and re-energization of said second mentioned heater by reengagement of said first and second members as a function of the cooling of said element, spring means associated with said first member affording it movement with a snap action to effect engagement or disengagement of said member with said second member according to the direction of movement when said first member is moved beyond a given intermediate position, spring means associated with said third member affording it movement with a snap action to effect disengagement of said member from said fourth member and engagement of said third member with said stationary member or vice versa according to the direction of movement when said third member is moved beyond a given intermediate position, and means affording at will adjustment of the time required per cycle of said thermal element in response to heat transferred thereto from said heaters.

11. The combination with first and second movable contact members affording completion of a circuit when engaged or alternatively affording interruption of said circuit when disengaged, of a bimetallic element, an electric heater in heat exchange relationship to said element for heating the same at a given rate, an electric heater in heat exchange relationship to said element for heating the same at a faster rate, a third movable contact member, a fourth movable contact member, a relatively stationary contact member, said third and fourth members being adapted to engage or disengage to complete or interrupt a series connection of said first mentioned heater with said first member, said third and stationary members being adapted to engage or disengage to complete or interrupt a series connection of said second mentioned heater with said first member, operating connections between said element, said first member, said third member and said fourth member affording initial positioning of the members such that said first and second members are engaged and said third and fourth members are engaged to complete said circuit and thereby to energize said first mentioned heater alone and then upon attainment of a given thermal condition of said element effecting movement of said third and fourth members for disengagement and for engagement of said third member and said stationary member thereby to de-energize said first mentioned heater and to energize said second mentioned heater, said element then acting under the influence of the second mentioned heater and through the medium of said operating connections effecting disengagement of said first and second members thereby to interrupt said circuit and de-energize said second mentioned heater subject to re-establishment of said circuit and re-energization of said second mentioned heater by reengagement of said first and second members as a function of the cooling of said element, spring means associated with said first member affording it movement with a snap action to effect engagement or disengagement of said member with said second member according to the direction of movement when said first member is moved beyond a given intermediate position, spring means associated with said third member affording it movement with a snap action to effect disengagement of said member from said fourth member and engagement of said third member with said stationary member or vice versa according to the direction of movement when said third member is moved beyond a given intermediate position, and means affording at will adjustment of the time required per cycle of said thermal element in response to heat transferred thereto from said heaters, the last mentioned means having associated therewith means whereby the said first and second members may at will be maintained engaged or disengaged free from influence by said thermal element.

12. The combination with a switch, of adjustable thermally responsive means to effect closing and opening of said switch according to the thermal condition of said means, said means comprising a bimetallic strip, a heater in heat exchange relationship to said strip, a pivoted supporting member to which said strip has one end secured adjacent the free end of said pivoted member whereby said strip may be adjusted relative to said heater by pivotal movement of said member and said strip having its switch operating extremity adjacent the pivot of said member to prevent motion being imparted to said switch by pivotal movement of said member to adjust said strip relative to said heater.

CLARENCE W. KUHN.

REFERENCES CITED

The following references are of record in the file of this patent:

UNITED STATES PATENTS

| Number | Name | Date |
|---|---|---|
| 2,331,737 | Scoggin | Oct. 12, 1943 |